US012724966B2

(12) United States Patent
Uziel et al.

(10) Patent No.: US 12,724,966 B2
(45) Date of Patent: Sep. 1, 2026

(54) TEXT AUGMENTATION USING DATASET RECONSTRUCTION

(71) Applicant: International Business Machines Corporation, Armonk, NY (US)

(72) Inventors: Guy Uziel, Rishon Lezion (IL); Esther Goldbraich, Kiryat Ata (IL); Ateret Anaby-Tavor, Givat Ada (IL); Adir Rahamim, Netanya (IL)

(73) Assignee: International Business Machines Corporation, Armonk, NY (US)

(*) Notice: Subject to any disclaimer, the term of this patent is extended or adjusted under 35 U.S.C. 154(b) by 249 days.

(21) Appl. No.: 18/623,064

(22) Filed: Apr. 1, 2024

(65) Prior Publication Data

US 2025/0307550 A1 Oct. 2, 2025

(51) Int. Cl.

| | |
|---|---|
| ***G06F 40/284*** | (2020.01) |
| ***G06N 3/02*** | (2006.01) |
| ***G06N 3/08*** | (2023.01) |
| ***G06N 3/096*** | (2023.01) |

(52) U.S. Cl.

CPC ............. *G06F 40/284* (2020.01); *G06N 3/02* (2013.01); *G06N 3/08* (2013.01); *G06N 3/096* (2023.01)

(58) Field of Classification Search

CPC .......... G06F 40/284; G06N 3/02; G06N 3/08; G06N 3/096

See application file for complete search history.

(56) References Cited

U.S. PATENT DOCUMENTS

| | | | | |
|---|---|---|---|---|
| 11,526,667 | B2 | 12/2022 | Kantor | |
| 2020/0372404 | A1* | 11/2020 | Mahmud | G06N 3/045 |
| 2021/0117718 | A1* | 4/2021 | Badjatiya | G06N 20/00 |
| 2021/0350076 | A1* | 11/2021 | Kantor | G06N 20/00 |
| 2023/0419049 | A1* | 12/2023 | Chen | G06F 16/35 |
| 2023/0419164 | A1* | 12/2023 | Mrini | G06N 3/0455 |
| 2024/0020546 | A1* | 1/2024 | Vu | G06N 5/022 |
| 2024/0144651 | A1* | 5/2024 | Bulat | G06V 10/761 |

(Continued)

FOREIGN PATENT DOCUMENTS

| | | |
|---|---|---|
| CN | 107526725 B | 8/2021 |

OTHER PUBLICATIONS

Ding et al., "DAGA: Data augmentation with a generation approach for low-resource tagging tasks." arXiv preprint arXiv:2011.01549 (Year: 2020).*

(Continued)

*Primary Examiner* — Samuel G Neway
(74) *Attorney, Agent, or Firm* — Scott Dobson

(57) ABSTRACT

A computer-implemented method comprising: receiving a source dataset comprising a plurality of textual data instances and corresponding labels in two or more classes; training a machine learning classifier on the source dataset; performing inference by the trained machine learning classifier over a subset of the data instances in the source dataset, to extract a hidden representation for each of said data instances in said subset; applying a trained multilayer perceptron (MLP) network to the extracted hidden representations, to generate a set of corresponding soft prompts; and feeding the generated set of soft-prompts as prompts for a trained language model, to tune the trained language model to reconstruct the data instances in the subset.

20 Claims, 5 Drawing Sheets

(56) References Cited

U.S. PATENT DOCUMENTS

| | | | | |
|---|---|---|---|---|
| 2025/0131212 | A1* | 4/2025 | Yu | G06F 40/284 |
| 2025/0307550 | A1* | 10/2025 | Uziel | G06F 40/284 |

OTHER PUBLICATIONS

Yang et al., "Generative data augmentation for commonsense reasoning." Findings of the Association for Computational Linguistics: EMNLP 2020 (Year: 2020).*

Akari Asai et al., "Attempt: Parameter-Efficient Multi-task Tuning via Attentional Mixtures of Soft Prompts"; Online at: https://arxiv.org/abs/2205.11961, Dec. 1, 2022.

Ateret Anaby-Tavor et al., "Do Not Have Enough Data? Deep Learning to the Rescue!"; Online at: https://arxiv.org/pdf/1911.03118.pdf, Nov. 27, 2019.

Brian Lester et al, "The Power of Scale for Parameter-Efficient Prompt Tuning"; In Proceedings of the 2021 Conference on Empirical Methods in Natural Language Processing, pp. 3045-3059, Nov. 2021.

Hugo Queiroz Abonizio et al, "Pre-trained Data Augmentation for Text Classification"; Intelligent Systems: 9th Brazilian Conference, BRACIS 2020, Rio Grande, Brazil, Proceedings, Part I, Oct. 2020, pp. 551-565, Oct. 20-23, 2020.

Jason Wei et al, EDA: Easy Data Augmentation Techniques for Boosting Performance on Text Classification Tasks; Online at: https://arxiv.org/abs/1901.11196, Jan. 31, 2019.

Lukas Fromme et al, "ContextGen: Targeted Data Generation for Low Resource Domain Specific Text Classification"; Proceedings of The 25th International Conference on Artificial Intelligence and Statistics, PMLR 151:3016-3027, 2022.

Maria Tsimpoukelli et al, "Multimodal Few-Shot Learning with Frozen Language Models"; Online at: https://arxiv.org/abs/2106.13884, Jun. 25, 2021.

Ruibo Liu et al, "Data Boost: Text Data Augmentation Through Reinforcement Learning Guided Conditional Generation"; In Proceedings of the 2020 Conference on Empirical Methods in Natural Language Processing (EMNLP), pp. 9031-9041, Nov. 16-20, 2020.

Tianyu Gao et al, "Making Pre-trained Language Models Better Few-shot Learners"; Online at: https://arxiv.org/abs/2012.15723, Jun. 2, 2021.

Tom B. Brown et al, "Language Models are Few-Shot Learners"; Online at: https://arxiv.org/abs/2005.14165, Jul. 22, 2020.

Tu Vu et al, "SPOT: Better Frozen Model Adaptation through Soft Prompt Transfer"; Online at: https://arxiv.org/abs/2110.07904, Oct. 15, 2021.

Xiang Dai et al, "An Analysis of Simple Data Augmentation for Named Entity Recognition"; Online at: https://arxiv.org/abs/2010.11683, Oct. 22, 2020.

Xiang Lisa Li et al, "Prefix-Tuning: Optimizing Continuous Prompts for Generation"; Online at: https://arxiv.org/abs/2101.00190, Jan. 1, 2021.

Xing Wu et al, "Conditional BERT Contextual Augmentation"; Online at: https://arxiv.org/abs/1812.06705, Dec. 17, 2018.

Yufei Wang et al, "PromDA: Prompt-based Data Augmentation for Low-Resource NLU Tasks"; Online at: https://arxiv.org/abs/2202.12499, Feb. 25, 2022.

* cited by examiner

TEXT AUGMENTATION USING DATASET RECONSTRUCTION

BACKGROUND

The invention relates to the field of machine learning and artificial intelligence.

Text classification is fundamental to machine learning and natural language processing. It includes various tasks, such as intent classification, which is a vital component of many automated chatbot platforms; sentiment analysis; topic classification; and relation classification.

The design and training of text classification models typically relies on datasets containing only a limited amount of data. To improve the performance of machine learning models in such low-resource settings, a data augmentation mechanism is often implemented. To achieve this, new data are synthesized from existing training data. It has been demonstrated that the use of data augmentation techniques can significantly improve the performance of various machine learning models. For computer vision and speech recognition, a number of well-established methods are available for synthesizing annotated data for use in training. Some of the basic methods, which may be class preserving, include applying various transformations to the data, such as cropping, padding, flipping, and shifting along time and space dimensions.

However, the application of simple transformations for textual data augmentation is more challenging, because simple transformations often misrepresent and distort the text, thereby producing grammatically and semantically incorrect texts that are at odds with the actual text distribution. Consequently, rule-based data augmentation methods for texts typically involve replacing one word with a synonym, deleting a word, or changing a word.

One promising recent approach has been the use of the capabilities of pre-trained language models, to generate new text from a source dataset.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising: receiving a source dataset comprising a plurality of textual data instances and corresponding labels in two or more classes; training a machine learning classifier on the source dataset; performing inference by the trained machine learning classifier over a subset of the data instances in the source dataset, to extract a hidden representation for each of said data instances in said subset; applying a trained multilayer perceptron (MLP) network to the extracted hidden representations, to generate a set of corresponding soft prompts; and feeding the generated set of soft-prompts as prompts for a trained language model, to tune the trained language model to reconstruct the data instances in the subset.

Another embodiment relates to a system comprising at least one hardware processor; and a non-transitory computer-readable storage medium having program code embodied therewith, the program code executable by the at least one hardware processor to: receive a source dataset comprising a plurality of textual data instances and corresponding labels in two or more classes, train a machine learning classifier on the source dataset, performing inference by the trained machine learning classifier over a subset of the data instances in the source dataset, to extract a hidden representation for each of said data instances in said subset, apply a trained multilayer perceptron (MLP) network to the extracted hidden representations, to generate a set of corresponding soft prompts, and feed the generated set of soft-prompts as prompts for a trained language model, to tune the trained language model to reconstruct the data instances in the subset.

A further embodiment relates to a computer program product comprising a non-transitory computer-readable storage medium having program code embodied therewith, the program code executable by at least one hardware processor to: receive a source dataset comprising a plurality of textual data instances and corresponding labels in two or more classes; train a machine learning classifier on the source dataset; perform inference by the trained machine learning classifier over a subset of the data instances in the source dataset, to extract a hidden representation for each of said data instances in said subset; apply a trained multilayer perceptron (MLP) network to the extracted hidden representations, to generate a set of corresponding soft prompts; and feed the generated set of soft-prompts as prompts for a trained language model, to tune the trained language model to reconstruct the data instances in the subset.

In some embodiments, the machine learning classifier is a pre-trained classifier configured for text classifications tasks.

In some embodiments, each of the hidden representations represents a contextual embedding of a corresponding one of the data instances in the subset.

In some embodiments, the machine learning classifier is based on the Bidirectional Encoder Representations from Transformers (BERT) family of classifiers.

In some embodiments, each of the hidden representations is a last hidden representation ([cls] token).

In some embodiments, the computer-implemented method further comprises averaging, and the program code is further executable to average, selected two of said soft prompts associated with one of said two or more classes, to obtain an aggregated soft prompt, and wherein said aggregated soft prompt is used as one of said prompts for said trained language model.

In some embodiments, the computer-implemented method further comprises averaging, and the program code is further executable to average, selected two of said soft prompts associated, respectively, with two different ones of said two or more classes, to obtain an aggregated soft prompt, and wherein said aggregated soft prompt is used as one of said prompts for said trained language model.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
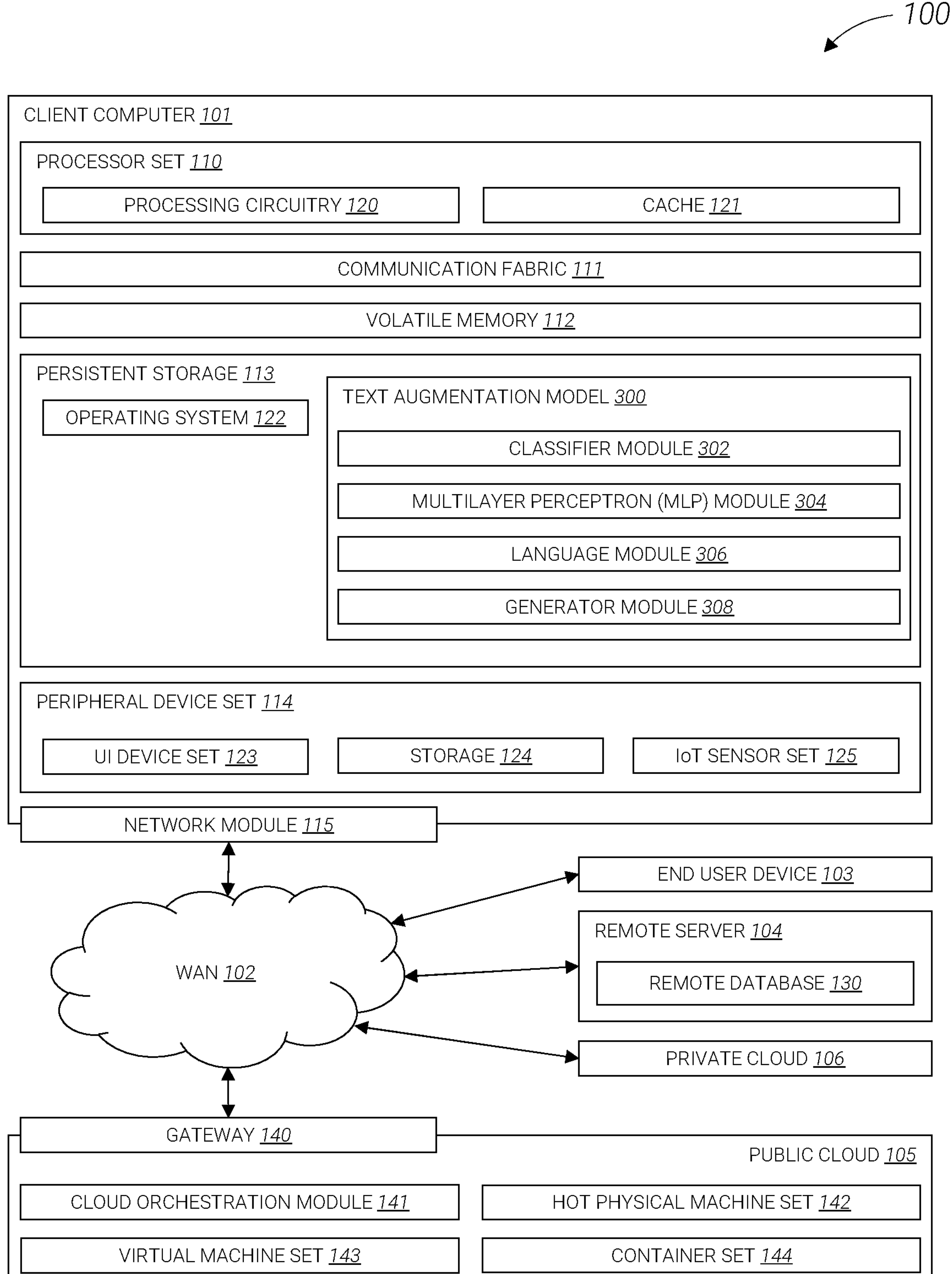
FIG. 1 is a block diagram of an exemplary computing environment, containing an example of an environment for the execution of at least some of the computer code involved in performing the inventive methods, according to an embodiment.

Disclosed herein is a technique, embodied as a computer-implemented method, a system, and a computer program product, which provides for a trained machine learning model configured to generate new text from a source training dataset, wherein the machine learning model is trained to reconstruct original sentences in the source training dataset from the hidden representations of a classifier model trained on the source training dataset.

The problem of data augmentation in a low-resource text classification may be represented as follows: Let $$\mathbb{X}_{train}=\{(x_i, y_i)\}_{i=1}^{N}$$

be a text classification dataset with L classes, where $x_i$ denotes a data instance or example in $\mathbb{X}_{train}$, and $y_i$ denotes its corresponding label. It is assumed that for each class, there exist m data instances, where m is a relatively low number. It is also assumed that validation set $\mathbb{X}_{val}$ and a test set $\mathbb{X}_{test}$ which are corresponding to $\mathbb{X}_{train}$ exist.

The objective may be defined as creating an augmented dataset $\mathbb{X}_{gen}$ from $\mathbb{X}_{train}$, such that the performance of a classifier model trained on $\mathbb{X}_{train}$ is improved by re-training the classifier on the union of the generated and the original datasets $\mathbb{X}_{train} \cup \mathbb{X}_{gen}$. The performance of the re-trained classifier is measured on test set $\mathbb{X}_{test}$.

Accordingly, in some embodiments, the present technique provides for a machine learning model configured to generate an augmented dataset $\mathbb{X}_{gen}$ from a source training dataset $\mathbb{X}_{train}$, by training the machine learning model to reconstruct original sentences in the source training dataset $\mathbb{X}_{train}$ from the hidden representations of a classifier trained on source training dataset $\mathbb{X}_{train}$.

In some embodiments, the present machine learning model is based on one or more frozen auto-regressive language models, which are tuned using generated soft-prompts with a relatively small number of trainable parameters and without requiring an additional pre-training phase. During the tuning or training phase of the language models, the present technique extracts the hidden representation from a pre-trained classifier model, and uses a Multi-Layer Perceptron (MLP) network to turn the hidden representation into soft-prompts. The soft-prompts are then fed into the frozen language models, to tune the frozen language models to reconstruct original sentences in the source training dataset.

In some embodiments, the present technique is motivated by the observation that, when using a pre-trained classifier that is trained from a language model, then the hidden representation of each textual data instance (e.g., each sentence) in the training dataset is a contextual embedding of the textual data instance. Thus, the soft-prompt generated from these hidden representations will also summarize contextual information from a small neighborhood of the data instances, giving the frozen language model additional information for enriching the original dataset. By using this training approach and manipulating the trained soft prompts, it is possible to generate novel sentences with their corresponding pseudo-labels.

In some embodiments, the present technique exploits the language-generation capabilities of language models by using soft-prompts, one of the dominant approaches for parameter-efficient tuning. Prompt-based learning enables large language models to adapt for downstream tasks, by carefully constructing prompts (i.e., textual instructions). the present technique uses soft-prompts, i.e., prompts which do not represent actual words and which can be incorporated into frozen pre-trained language models. As previously demonstrated, pre-trained language models with soft-prompts provide better performance in low-resource settings, and enable end-to-end optimization of downstream tasks.

Reference is now made to FIG. 1, which shows a block diagram of an exemplary computing environment 100, containing an example of an environment for the execution of at least some of the computer code involved in performing the inventive methods, such as text augmentation model 300, comprising a classifier module 302, a multilayer perceptron (MLP) module 304, a language module 306, and/or a generator module 308 In addition to block 300, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and block 300, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
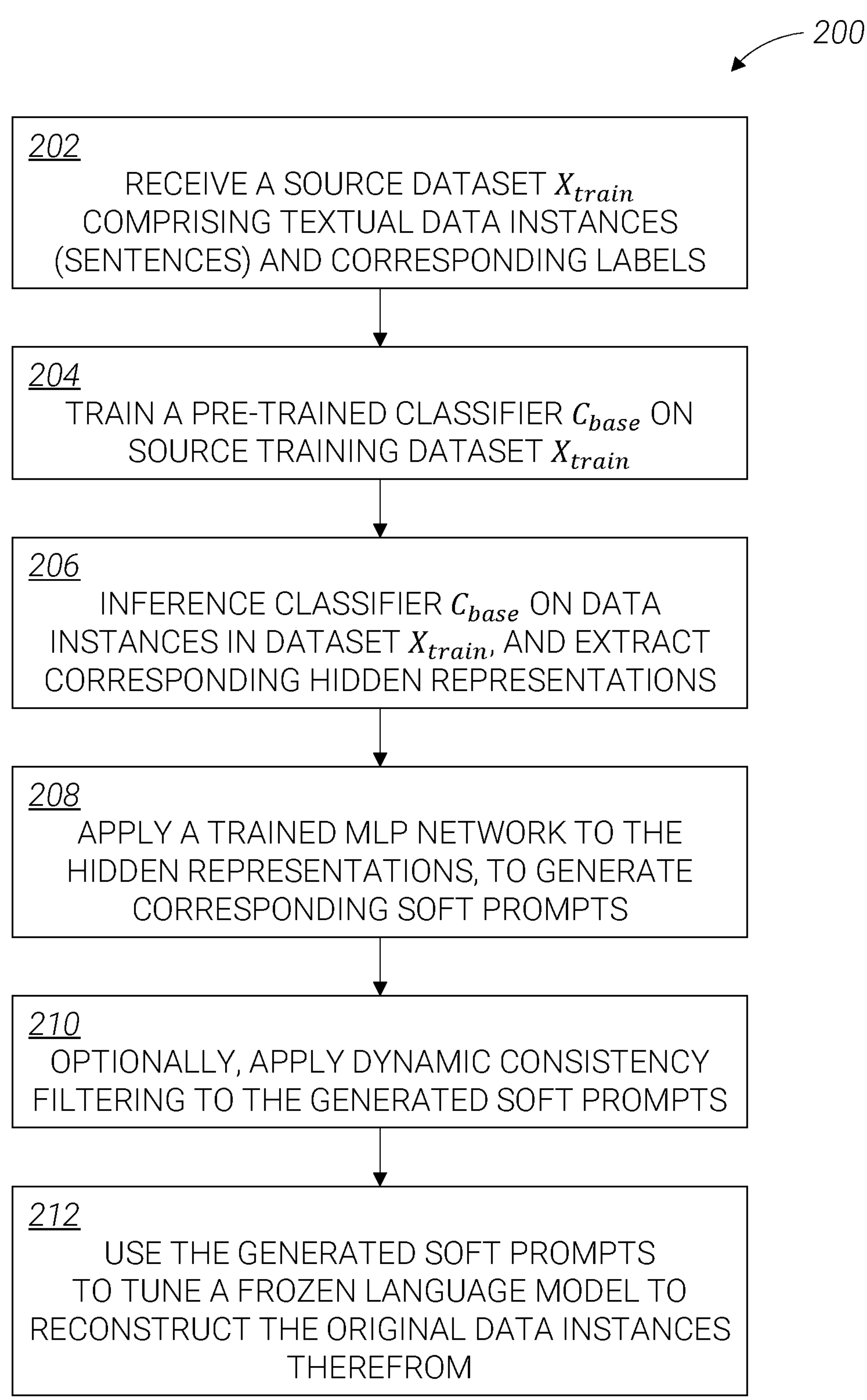
FIG. 2 illustrates a method for training a machine learning model to generate new text from a source training dataset.

The instructions of text augmentation model 300 are now discussed with reference to the flowchart of FIG. 2, which illustrates a method 200 for training a machine learning model to generate new text from a source training dataset, wherein the machine learning model is trained to reconstruct original sentences in the source training dataset from the hidden representations of a classifier model trained on source training dataset.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by computer 101 of FIG. 1, or by any other applicable component of computing environment 100), unless specifically stated otherwise.

Figure 3:
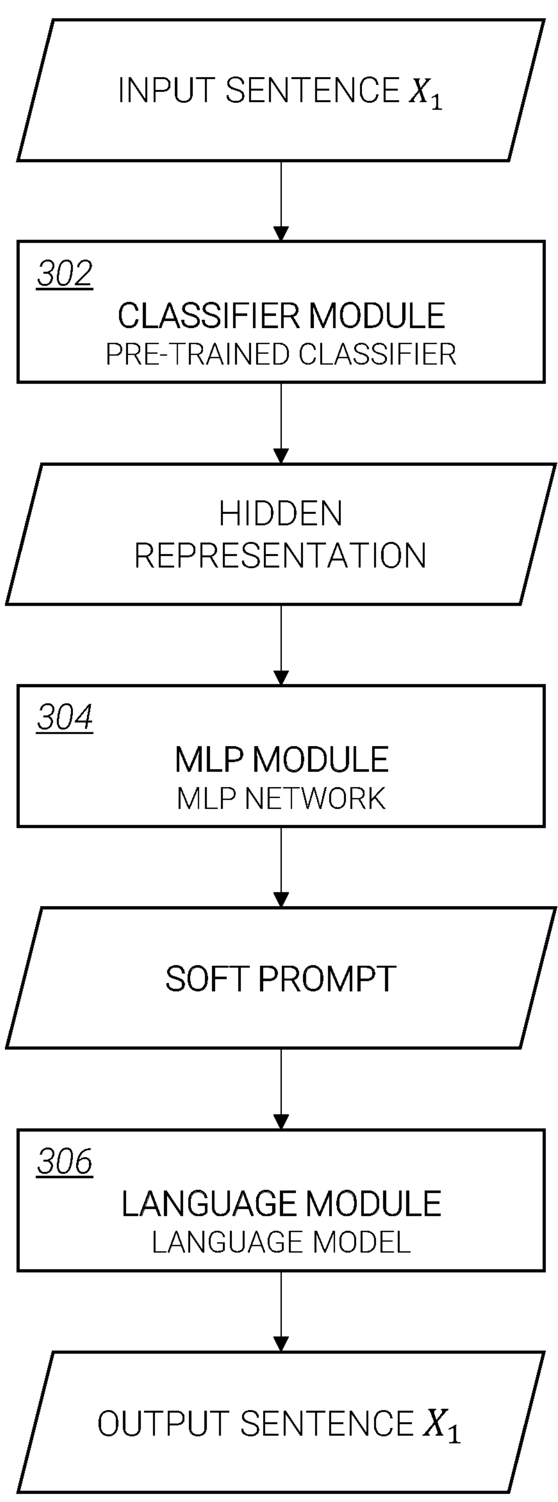
FIG. 3 is a schematic diagram of the process steps in a method for training a machine learning model to generate new text from a source training dataset.

FIG. 3 is a schematic diagram of the process steps in a method of the present disclosure for training a machine learning model to generate new text from a source training dataset, wherein the machine learning model is trained to reconstruct original sentences in the source training dataset from the hidden representations of a classifier model trained on source training dataset.

Method 200 begins in step 202, wherein text augmentation model 300 receives, as input, a source training dataset $\mathbb{X}_{train}$ comprising m textual data instances or examples $(x_1 \ldots x_m)$, wherein each data instance is associated with a corresponding label y, $(y_1 \ldots y_m)$.

In step 204, the instructions of classifier module 302 may cause text augmentation model 300 to train a classifier $\mathbb{C}_{base}$ on source training dataset $\mathbb{X}_{train}$ received in step 202.

In some embodiments, classifier $\mathbb{C}_{base}$ may be a pre-trained classifier. In some embodiments, classifier $\mathbb{C}_{base}$ may be configured for text classifications tasks. For example, in some embodiments, classifier $\mathbb{C}_{base}$ may be based on the Bidirectional Encoder Representations from Transformers (BERT) family of classifiers. BERT is a language model pre-trained using two unsupervised tasks: masked language model and next-sentence prediction, on the "BooksCorpus" (800 million words). However, in other embodiments, step 204 may employ any suitable classifier, including, but not limited to, Support Vector Machine (SVM) classifiers dedicated to natural language processing, Long Short Term Memory (LSTM) classifiers, and the like.

In step 206, the instructions of multilayer perceptron (MLP) module 304 may cause text augmentation model 300 to select a first data instance $x_1$ from source training dataset $\mathbb{X}_{train}$, wherein first data instance $x_1$ has a corresponding label $y_1$, $(x_1, y_1)$. The instructions of MLP module 304 may then cause text augmentation model 300 to inference pre-trained classifier $\mathbb{C}_{base}$ over first data instance $x_1$, and to extract from pre-trained classifier $\mathbb{C}_{base}$ the hidden representation h associated with the inferencing over first data instance $x_1$.

In some embodiments, in the case of a pre-trained classifier $\mathbb{C}_{base}$ trained from a language model, the hidden representation h is a contextual embedding of the original data instance $x_1$. In some embodiments, in the case of a pre-trained classifier $\mathbb{C}_{base}$ trained from a language model (such as BERT, as described hereinabove), the hidden representation h is the last hidden representation (i.e., [cls] token).

In some embodiments, step 206 may be performed with respect to one or more data instances in source training dataset $\mathbb{X}_{train}$, e.g., with respect to a predetermined number k of data instance $(x_1 \ldots x_k)$. The instructions of MLP module 304 may then cause text augmentation model 300 to inference pre-trained classifier $\mathbb{X}_{base}$ over data instances $(x_1 \ldots x_k)$, and to extract the hidden representations $(h_1 \ldots h_k)$ associated with the inferencing of each of the data instances $(x_1 \ldots x_k)$. In some embodiments, in the case of a pre-trained classifier $\mathbb{X}_{base}$ trained from a language model (such as BERT, as described hereinabove), the hidden representations $(h_1 \ldots h_k)$ represent contextual embeddings of the original data instances $(x_1 \ldots x_k)$.

In some embodiments, step 206 may be performed with respect to all m data instances in source training dataset $\mathbb{X}_{train}$, $(x_1 \ldots x_m)$. The instructions of MLP module 304 may then cause text augmentation model 300 to inference pre-trained classifier $\mathbb{C}_{base}$ over data instances $(x_1 \ldots x_m)$, and to extract the hidden representations $(h_1 \ldots h_m)$ associated with the inferencing of each of the data instances $(x_1 \ldots x_m)$. In some embodiments, in the case of a pre-trained classifier $\mathbb{C}_{base}$ trained from a language model (such as BERT, as described hereinabove), the hidden representations $(h_1 \ldots h_m)$ represent contextual embeddings of the original data instances $(x_1 \ldots x_m)$.

In step 208, the instructions of MLP module 304 may cause text augmentation model 300 to apply a trained multilayer perceptron (MLP) network, to transform each of the one or more hidden representations h extracted in step 206 into a corresponding "soft-prompt" P, which may be used for prompt-tuning of a frozen language model.

Accordingly, in some embodiments, the instructions of MLP module 304 may cause text augmentation model 300 to feed each of the one or more hidden representations h extracted in step 206 (i.e., $h_1$, $(h_1 \ldots h_k)$, $(h_1 \ldots h_m)$) as inputs to an MLP network, wherein the MLP network is trained with parameters $\theta_{MLP}$, to turn the hidden representations h into corresponding prompts P (i.e., $P_1$, $(P_1 \ldots P_k)$, $(P_1 \ldots P_m)$) of length n each. In some embodiments, the label for each soft prompt P (i.e., each of $P_1$, $(P_1 \ldots P_k)$, $(P_1 \ldots P_m)$) is set as the corresponding label y of the data instance or example x from which the soft prompt P was generated.

In some embodiments, the MLP network has two hidden layers and a ReLU activation. In some embodiments, the prompts P have a length n set as 10.

In some embodiments, step 208 may comprise generating intra-class aggregated soft prompts $P_{agg}$ from two soft prompts P corresponding to two data instances in the same class in source training dataset $\mathbb{X}_{train}$. The motivation behind this intra-class approach is that by combining soft prompts from the same class, it will enrich the class lexically and semantically. In some embodiments, the aggregated soft prompts $P_{agg}$ representing two data instances in the same class are constructed as follows: two data instances or examples $x_1$, $x_2$ are selected from the same class in source training dataset $\mathbb{X}_{train}$, and their corresponding hidden representations $h_1$, $h_2$ are extracted as described with reference to step 206 hereinabove. Using the trained MLP network, the hidden representations $h_1$, $h_2$ are transformed into corresponding soft prompts $P_1$, $P_2$, as described with reference to step 208 hereinabove. Then, the two generated prompts $P_1$, $P_2$ are averaged, to obtain a new aggregated soft prompt $P_{agg}$. The pseudo-label for the aggregated prompt $P_{agg}$ is set as per the common class of data instances $x_1$, $x_2$.

Figure 4:
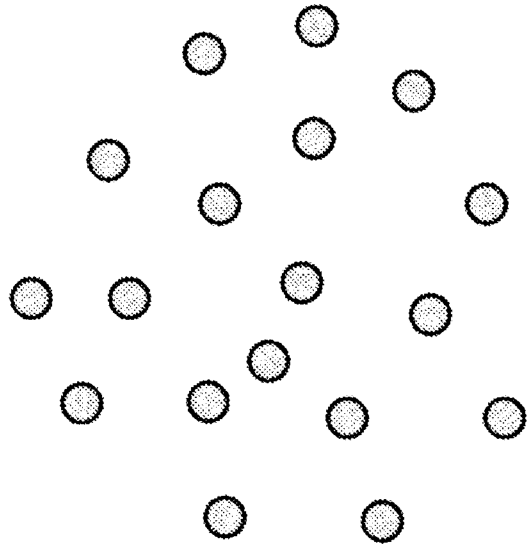
FIG. 4 schematically shows intra-class soft prompt generation.
Figure 4:
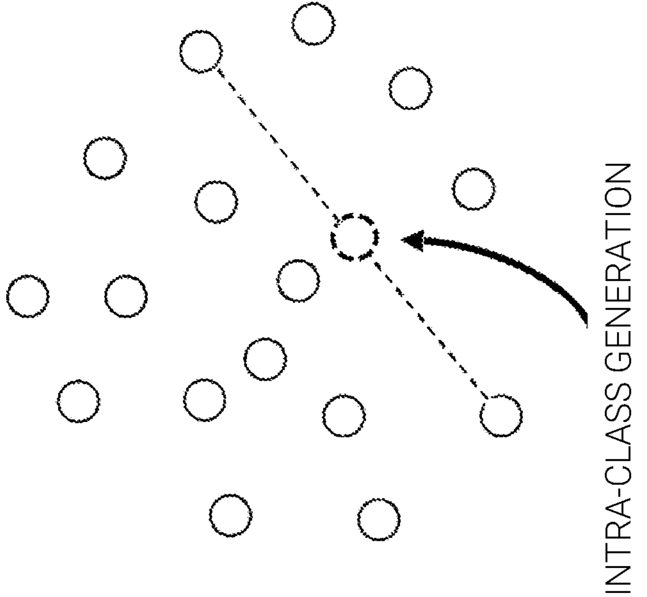

FIG. 4 schematically shows intra-class soft prompt generation, comprising sampling two instances from the same class, and averaging their prompts. The averaged prompt is then used as a prompt for the language model.

In some embodiments, step 208 may comprise generating inter-class aggregated soft prompts $P_{agg}$ from two soft prompts P corresponding to two data instances in two different classes in source training dataset $\mathbb{X}_{train}$. The motivation for this inter-class generation is to help the classifier to better distinguish between the different classes. In some embodiments, the aggregated soft prompts $P_{agg}$ representing to data instances in two different classes are constructed as follows: two data instances or examples $x_1$, $x_2$ are selected from the two different classes in source training dataset $\mathbb{X}_{train}$, and their corresponding hidden representations $h_1$, $h_2$ are extracted as described with reference to step 206 hereinabove. Using the trained MLP network, the hidden representations $h_1$, $h_2$ are transformed into corresponding soft prompts $P_1$, $P_2$, as described with reference to step 208 hereinabove. Then the two prompts are aggregated by taking their weighted mean, $P_{agg}=w_1+(1-w)_2$, where $0<w<1$ is sampled uniformly. In this case, the pseudo-label is set as the label of the closest prompt as illustrated in FIG. 5.

Figure 5:
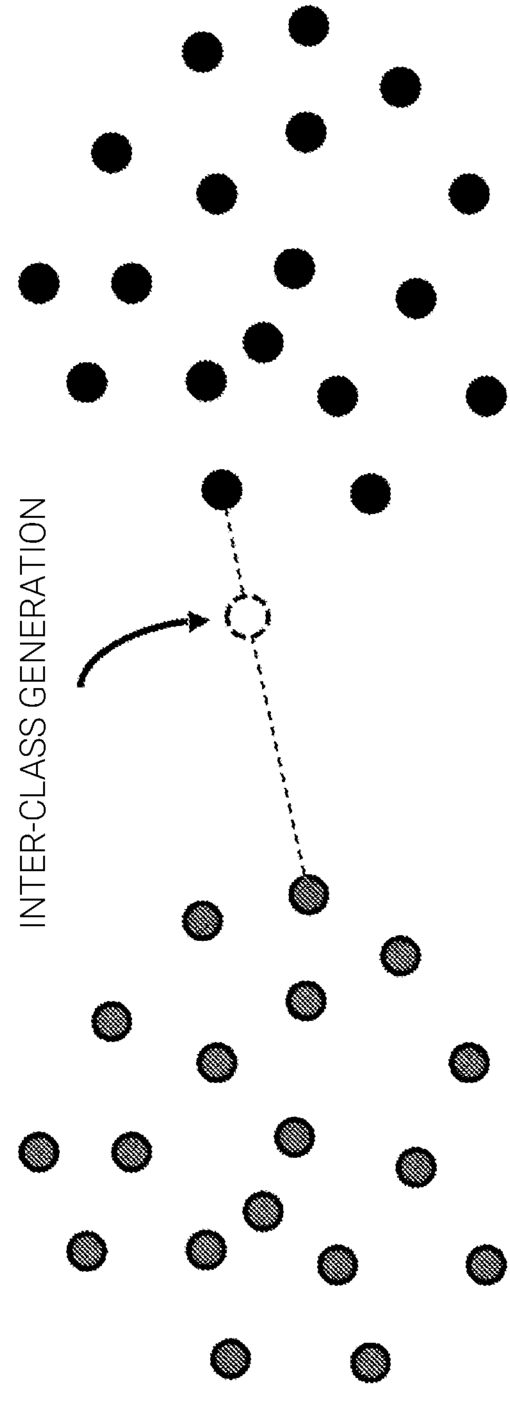
FIG. 5 schematically shows inter-class soft prompt generation.

FIG. 5 schematically shows inter-class soft prompt generation, comprising sampling two data instances from two different classes and calculating the weighted average of their prompts (the weights are sampled randomly). The pseudo-label is decided according to the closest sample.

In some embodiments, in optional step 210, the instructions of generator module 308 may cause text augmentation model 300 to apply a filtering step to the soft prompts generated in step 208, to remove soft-prompts with incorrect pseudo-labels and/or out-of-domain soft prompts.

In some embodiments, the instructions of generator module 308 may cause text augmentation model 300 to apply a dynamic consistency filtering approach, which relies on an evaluation dataset to approximate the optimal portion of the generated soft prompt instances. This may be achieved by training k classifiers, each of which trained on a different quantile of the generated soft prompt instances, as ordered by their SoftMax scores (which is obtained from the pre-trained classifier). After training the k classifiers, the best preforming classifier is selected using the evaluation dataset. In some embodiments, this filtering approach may be applied in a recursive manner, for example, by training a classifier on the filtered data and running that classifier on the original generated dataset, to improve the filtering of the soft prompt instances.

In step 212, the instructions of generator module 308 may cause text augmentation model 300 to tune a frozen pre-trained language model $\mathcal{LM}$ using the soft prompts P, and/or intra-class and/or inter-class $P_{agg}$, generated in step 208, so as to tune or train language model $\mathcal{LM}$ to reconstruct the original sentence (data instance) x in source training dataset $\mathbb{X}_{train}$.

Accordingly, in some embodiments, the instructions of generator module 308 may cause text augmentation model 300 to feed into the frozen language model $\mathcal{LM}$, which may be embodied in language module **30*ss*6, some or all of the soft prompts P, and/or intra-class and/or inter-class soft prompts $P_{agg}$, generated in step 208**, to train language model $\mathcal{LM}$ to reconstruct each original sentence (data instance) x source training dataset $\mathbb{X}_{train}$, using only its corresponding hidden representation h.

At the conclusion of tuning or training step 212, a trained machine learning model embodied in text augmentation model 300 is configured to generate new text from an input sentence, based on the hidden representations of a pre-trained classifier.

Algorithm 1 below is an exemplary algorithm configured to carry out the steps of method 200 for training a machine learning model to generate new text from a source training dataset, wherein the machine learning model is trained to reconstruct original sentences in a source training dataset from the hidden representations of a classifier model trained on training dataset.

Algorithm 1:

INPUT: Training dataset $\mathbb{X}_{train}$, pre-trained classifier $\mathbb{C}_{base}$, pre-trained language model $\mathcal{LM}$

```
1:  while training steps not done do
2:    for (x, y) in X_train do
3:      Extract h from C_base
4:      P ← MLP(h)     %transform the hidden representation into soft-prompt.
5:      x̂ ← LM (P)     %predict a sentence using the soft-prompt
6:      θ_MLP ← θ_MLP − ∇θ_MLP L_lm(x, x̂)
7:    end for
8:  end while
9:  X_intra ← GEN_intra(LM , MLP, X_train)
10: X_inter ← GEN_inter(LM , MLP, X_train)
11: X_gen ← X_intra ∪ X_inter
12: X_gen ← Filtration( X_train, X_val, X_gen)
```

EXPERIMENTS RESULTS

The present inventors conducted experiments on four multi-class classification datasets (described hereinbelow). Each benchmark dataset was split into 80% $\mathbb{X}_{train}$ training dataset, 10% $\mathbb{X}_{val}$ evaluation dataset, and 10% $\mathbb{X}_{test}$ test dataset.

In the experiments by the present inventors, one or more of the following datasets was used as source training dataset $\mathbb{X}_{train}$:

- Airline Travel Information Systems (ATIS): ATIS is a dataset consisting of audio recordings and corresponding manual transcripts of humans asking for flight information on automated airline travel inquiry systems. The data consist of 17 unique classes (intent categories).
- The Text REtrieval Conference (TREC): TREC comprises 5,500 labeled sentences represented as questions, across 6 broad class labels and 50 fine class labels. Average length of each sentence is 10, with a vocabulary size of 8,700.
- Banking77 Dataset: Banking77 is composed of online customer queries in the banking domain, annotated with their corresponding intents. It comprises 13,083 customer service queries, labeled with 77 intents.
- Telco-Bot (T-Bot): An intent classification dataset, which includes data used for the training of chatbots used by telco companies for customer support.

The properties of the various datasets used in the exemplary implementation are summarized in Table 1 below.

TABLE 1

| Name | Domain | No. of Classes | Size |
|---|---|---|---|
| ATIS | Flight reservation | 17 | 4.2k |
| TREC | Open-domain questions | 50 | 6k |
| Banking77 | Banking | 77 | 13k |
| T-Bot | Telco customer support | 87 | 17k |

A set of K∈(5,10) examples was sampled for each class from each training dataset, resulting in a shot-K dataset.

The BERT model (see https://huggingface.co/bert-base-uncased) was selected as the pre-trained classifier $\mathbb{C}_{base}$. The performance of $\mathbb{C}_{base}$ was evaluated during training using $\mathbb{X}_{val}$.

The T5-large language model was used for all of experiments. This model was fine tuned an additional 100k steps on the C4 dataset using the regular LM loss, to achieve better adaptivity to soft prompt tuning.

An MLP network with two hidden layers and a ReLU activation was used. The prompt-length is set as 10 in all of the experiments.

The present model was trained for 100 epochs. The model was evaluated every 20 epochs, resulting in 5 checkpoints. For the dynamic filtering, 10 classifiers were used, with the same configuration as the pre-trained classifier $\mathbb{C}_{base}$, wherein each of the classifiers is trained on a different portion of the generated dataset ordered by the SoftMax score of $\mathbb{C}_{base}$.

The average accuracy results are shown in Table 2A for shot-5 and Table 2B for shot-10, with comparison to the following multi-class benchmark:

- The rule-based data augmentation methods EDA (see Jason Wei and Kai Zou. 2019. Eda: Easy data augmentation techniques for boosting performance on text classification tasks. arXiv preprint arXiv:1901.11196).
- CBERT (see Xing Wu, Shangwen Lv, Liangjun Zang, Jizhong Han, and Songlin Hu. 2019. Conditional bert contextual augmentation. In International conference on computational science, pages 84-95. Springer).
- LAMBADA (see Ateret Anaby-Tavor, Boaz Carmeli, Esther Goldbraich, Amir Kantor, George Kour, Segev Shlomov, Naama Tepper, and Naama Zwerdling. 2020. Do not have enough data? deerom learning to the rescue! In Proceedings of the AAAI Conference on Artificial Intelligence, volume 34, pages 7383-7390).
- PromDA (see Yufei Wang, Can Xu, Qingfeng Sun, Huang Hu, Chongyang Tao, Xiubo Geng, and Daxin Jiang. 2022. Promda: Prompt-based data augmentation for low-resource nlu tasks. arXiv preprint arXiv: 2202.12499). PromDA is implemented with a T5-large model (700M parameters).

All hyperparameters used for these methods are those recommended by the authors. The experiments were repeated five times, and the averaged accuracy for each shot-k dataset is reported.

TABLE 2A

Average accuracy results (Shot-5)

| | Shot-5 Dataset | | | |
|---|---|---|---|---|
| Method | ATIS | TREC | Banking77 | T-Bot |
| $\mathbb{C}_{base}$ | 0.739 | 0.495 | 0.689 | 0.681 |

TABLE 2A-continued

Average accuracy results (Shot-5)

| Method | Shot-5 Dataset ATIS | TREC | Banking77 | T-Bot |
|---|---|---|---|---|
| EDA | 0.735 | 0.524 | 0.7 | 0.684 |
| C-BERT | 0.75 | 0.517 | 0.682 | 671 |
| LAMBADA | 0.88 | 0.566 | 0.709 | 0.703 |
| PromDA | 0.867 | 0.583 | 0.739 | 0.692 |
| Present Model | 0.906 | 0.641 | 0.733 | 0.71 |

TABLE 2B

Average accuracy results (Shot-10)

| Method | Shot-10 Dataset ATIS | TREC | Banking77 | T-Bot |
|---|---|---|---|---|
| $\mathbb{C}_{base}$ | 0.772 | 0.713 | 0.798 | 0.741 |
| EDA | 0.806 | 0.72 | 0.793 | 0.749 |
| C-BERT | 0.877 | 0.727 | 0.805 | 0.747 |
| LAMBADA | 0.871 | 0.745 | 0.787 | 0.74 |
| PromDA | 0.897 | 0.742 | 0.791 | 0.752 |
| Present Model | 0.933 | 0.773 | 0.839 | 0.788 |

It can be observed that the addition of the generated data from the present model to the classification models significantly improves the performance of $\mathbb{C}_{base}$ and outperforms the existing method. Overall, the EDA rule-based approach does not lead to a significant improvement over $\mathbb{C}_{base}$ on the more challenging datasets Banking77 and T-Bot on both shot-5 and shot-10. On the other hand, the language-model-based approaches, i.e., C-BERT, LAMBADA, PromDA and the present model outperform the rule-based approach. PromDA can provide better results than LAMBADA on the ATIS and TREC datasets. However, with the exception of Banking77 (shot-5), it fails when considering domain-specific datasets with a larger number of classes, such as Banking77 and T-Bot.

On T-Bot and Banking77 in the shot-10 setting none of the methods except the present model where able to give a statistically significant improvement over.

The accuracy improvements of the present model over $\mathbb{C}_{base}$ on the ATIS dataset are approximately 20% for both shot-5 and shot-10. For TREC the improvement rate is 29% for the shot-5 setting and 9% for the shot-10 setting. For Banking77, the average improvement rate is 4.5% and for the challenging T-Bot dataset the average improvement rate is 5%.

Tables 3A and 3B below show the average of the generation quality measures for two of the multi-class classification tasks, ATIS and Banking77, based on the following measures:

- Recall and Precision: Given two distributions P, Q, this measure compares their "precision", or how much of Q can be generated by a "part" of P, while "recall" measures how much of P can be generated by a "part" of Q. Recall and Precision are summarized as F1.
- Complexity: Quantifies how difficult observations are, given their true class label and how they will challenge the classifier. The measure can be used to automatically determine a baseline performance threshold.
- MAUVE: This metric measures the gap between two text distributions by calculating the area under the information divergence curve. A recent study found MAUVE to be the most robust performance measure for text generation quality.

In this set of experiments, the generated text was compared to the test set, which represents the actual text distribution. A desired property of the augmented texts is that their distribution will expand the intersection between the support of the train distribution with the test distribution. Thus, the generation quality of the different methods can be compared by observing how close they are to the test distribution.

TABLE 3A

Average generation quality (Shot-5)

| Method | Shot-5 F1 | MAUVE | Complexity |
|---|---|---|---|
| | ATIS | | |
| LAMBADA | 0.66 | 0.78 | 10.01 |
| PromDA | 0.7 | 0.71 | 8.44 |
| Present Model | 0.75 | 0.7 | 13.67 |
| | Banking77 | | |
| LAMBADA | 0.79 | 0.72 | 2.67 |
| PromDA | 0.83 | 0.75 | 3.66 |
| Present Model | 0.86 | 0.78 | 2.61 |

TABLE 3B

Average generation quality (Shot-10)

| Method | Shot-10 F1 | MAUVE | Complexity |
|---|---|---|---|
| | ATIS | | |
| LAMBADA | 0.76 | 0.8 | 5.43 |
| PromDA | 0.74 | 0.76 | 4.67 |
| Present Model | 0.73 | 0.82 | 5.91 |
| | Banking77 | | |
| LAMBADA | 0.86 | 0.8 | 2.56 |
| PromDA | 0.85 | 0.75 | 3.65 |
| Present Model | 0.88 | 0.87 | 2.31 |

As can be seen, the measures of the text generated by the present model are superior to 2 out of 3 in all configurations. This demonstrates that the present model can generate text that is close to the actual distribution of the data. In addition, it can be observed from the ATIS dataset that the present model is able to produce more challenging and complex sentences for the classifier.

Next, the proposed dynamic filtering method detailed hereinabove was shown to be effective in filtering out low-quality generated data.

Here, there is proposed a further approach for filtering the generated data without relying on the existence of an evaluation dataset. The method can be described as follows: As in the Dynamic Consistency Filtering approach detailed hereinabove, for each class, the generated examples are ordered according to their SoftMax scores obtained from the pre-trained classifier. Then, all instances on which the classifier disagrees with the pseudo-label are filtered out. Then, k classifiers are trained on a different quantile of the ordered data (i.e., for k=5, the i-th classifier i=1, . . . , 5, is trained on the i/5 quantile). Then, the obtained classifiers are used to filter out the generated instances based on the majority vote of the classifiers. This approach is denoted as Present Model$_{maj}$. As shown in Tables 4A-4B below, with the exception ATIS (shot-5) and Banking77 (shot-5), Present Model$_{maj}$ outperforms the benchmark methods, and on average only slightly degrades the performance of the normal Present Model.

TABLE 4A

Average accuracy with dynamic filtering (Shot-5)

| Method | Shot-5 ATIS | TREC | Banking77 | T-Bot |
|---|---|---|---|---|
| $\mathbb{C}_{base}$ | 0.739 | 0.495 | 0.689 | 0.681 |
| Present Model | 0.906 | 0.641 | 0.733 | 0.71 |
| Present Model$_{maj}$ | 0.847 | 0.615 | 0.738 | 0.726 |

TABLE 4B

Average accuracy with dynamic filtering (Shot-10)

| Method | Shot-10 ATIS | TREC | Banking77 | T-Bot |
|---|---|---|---|---|
| $\mathbb{C}_{base}$ | 0.792 | 0.713 | 0.798 | 0.741 |
| Present Model | 0.933 | 0.773 | 0.839 | 0.788 |
| Present Model$_{maj}$ | 0.911 | 0.761 | 0.833 | 0.767 |

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:

receiving a source dataset comprising: a plurality of textual data instances, and corresponding labels in two or more classes;

training a machine learning classifier on the source dataset;

performing inference by the trained machine learning classifier over a subset of said data instances in the source dataset, to extract a hidden representation for each of said data instances in said subset;

applying a trained multilayer perceptron (MLP) network to the extracted hidden representations, to generate a set of corresponding soft prompts; and feeding the generated set of soft prompts as prompts for a trained language model, to tune said trained language model to reconstruct said data instances in said subset.

2. The computer-implemented method of claim 1, wherein said machine learning classifier is a pre-trained classifier configured for text classifications tasks.

3. The computer-implemented method of claim 1, wherein each of said hidden representations represents a contextual embedding of a corresponding one of said data instances in said subset.

4. The computer-implemented method of claim 1, wherein said machine learning classifier is based on the Bidirectional Encoder Representations from Transformers (BERT) family of classifiers.

5. The computer-implemented method of claim 4, wherein each of said hidden representations is a last hidden representation.

6. The computer-implemented method of claim 1, further comprising averaging selected two of said soft prompts associated with one of said two or more classes, to obtain an aggregated soft prompt, and wherein said aggregated soft prompt is used as one of said prompts for said trained language model.

7. The computer-implemented method of claim 1, further comprising averaging selected two of said soft prompts associated, respectively, with two different ones of said two or more classes, to obtain an aggregated soft prompt, and wherein said aggregated soft prompt is used as one of said prompts for said trained language model.

8. A system comprising:

at least one hardware processor; and a non-transitory computer-readable storage medium having program code embodied therewith, the program code executable by said at least one hardware processor to:

receive a source dataset comprising a plurality of textual data instances and corresponding labels in two or more classes, train a machine learning classifier on the source dataset, perform inference by the trained machine learning classifier over a subset of said data instances in the source dataset, to extract a hidden representation for each of said data instances in said subset, apply a trained multilayer perceptron (MLP) network to the extracted hidden representations, to generate a set of corresponding soft prompts, and feed the generated set of soft prompts as prompts for a trained language model, to tune said trained language model to reconstruct said data instances in said subset.

9. The system of claim 8, wherein said machine learning classifier is a pre-trained classifier configured for text classifications tasks.

10. The system of claim 8, wherein each of said hidden representations represents a contextual embedding of each a corresponding one of said data instances in said subset.

11. The system of claim 8, wherein said machine learning classifier is based on the Bidirectional Encoder Representations from Transformers (BERT) family of classifiers.

12. The system of claim 11, wherein s each of said hidden representations is a last hidden representation.

13. The system of claim 8, wherein said program code is further executable to average selected two of said soft prompts associated with the same one of said two or more classes, to obtain an aggregated soft prompt, and wherein said aggregated soft prompt is used as one of said prompts for said trained language model.

14. The system of claim 8, wherein said program code is further executable to average selected two of said soft prompts associated, respectively, with two different ones of said two or more classes, to obtain an aggregated soft prompt, and wherein said aggregated soft prompt is used as one of said prompts for said trained language model.

15. A computer program product comprising a non-transitory computer-readable storage medium having program code embodied therewith, the program code executable by at least one hardware processor to:

receive a source dataset comprising a plurality of textual data instances and corresponding labels in two or more classes;

train a machine learning classifier on the source dataset;

perform inference by the trained machine learning classifier over a subset of said data instances in the source dataset, to extract a hidden representation for each of said data instances in said subset;

apply a trained multilayer perceptron (MLP) network to the extracted hidden representations, to generate a set of corresponding soft prompts; and feed the generated set of soft prompts as prompts for a trained language model, to tune said trained language model to reconstruct said data instances in said subset.

16. The computer program product of claim 15, wherein said machine learning classifier is a pre-trained classifier configured for text classifications tasks.

17. The computer program product of claim 15, wherein each of said hidden representations represents a contextual embedding of each a corresponding one of said data instances in said subset.

18. The computer program product of claim 15, wherein said machine learning classifier is based on the Bidirectional Encoder Representations from Transformers (BERT) family of classifiers, and wherein each of said hidden representations is a last hidden representation.

19. The computer program product of claim 15, wherein said program code is further executable to average selected two of said soft prompts associated with one of said two or more classes, to obtain an aggregated soft prompt, and wherein said aggregated soft prompt is used as one of said prompts for said trained language model.

20. The computer program product of claim 15, wherein said program code is further executable to average selected two of said soft prompts associated, respectively, with two different ones of said two or more classes, to obtain an aggregated soft prompt, and wherein said aggregated soft prompt is used as one of said prompts for said trained language model.

* * * * *